United States Patent [19]

Bernhardt et al.

[11] 4,296,732

[45] Oct. 27, 1981

[54] SOLAR RADIATION COLLECTOR

[75] Inventors: Winfried Bernhardt; Edgard Grundmann; Rudolf Kroll, all of Wolfsburg, Fed. Rep. of Germany

[73] Assignee: Volkswagenwerk AG, Wolfsburg, Fed. Rep. of Germany

[21] Appl. No.: 116,397

[22] Filed: Jan. 29, 1980

[30] Foreign Application Priority Data

Feb. 1, 1979 [DE] Fed. Rep. of Germany ....... 2903775

[51] Int. Cl.³ ................................................ F24J 3/02
[52] U.S. Cl. ................................... 126/426; 126/438
[58] Field of Search ............... 126/426, 449, 450, 438, 126/439; 52/2; 220/339; 206/522; 9/11 A

[56] References Cited

U.S. PATENT DOCUMENTS

| | | | |
|---|---|---|---|
| 3,125,091 | 3/1964 | Sleeper, Jr. | 126/426 |
| 3,859,980 | 1/1975 | Crawford | 126/426 |
| 3,949,095 | 4/1976 | Pelehach | 126/426 |
| 4,076,015 | 2/1978 | Mattson | 126/439 |

Primary Examiner—James C. Yeung
Attorney, Agent, or Firm—Spencer & Kaye

[57] ABSTRACT

In a solar radiation collector composed of a mat formed of a black foil member and a radiation pervious foil member, the two members being joined together along the outer edges of the mat and at interior locations of the mat to form an extended flow path and an inlet and outlet for a fluid heat carrier medium, the collector further including a cover connected to the mat along opposed edges thereof and arranged to be disposed in the path of solar radiation toward the mat with an air space being defined between the mat and the cover, with the cover being formed to define a flexible support for holding at least one radiation pervious pane and at least one reflecting panel in relative positions such that the pane, the panel and the mat constitute the legs of a triangle enclosing the air space.

4 Claims, 4 Drawing Figures

SOLAR RADIATION COLLECTOR

BACKGROUND OF THE INVENTION

The present invention relates to a solar radiation collector of the type composed of a mat formed of a black foil member and a radiation pervious foil member, the two members being joined together along the outer edges of the mat and at interior locations of the mat to form an extended flow path and an inlet and outlet for a fluid heat carrier medium, the collector further including a cover connected to the mat along opposed edges thereof and arranged to be disposed in the path of solar radiation toward the mat with an air space being defined between the mat and the cover.

Solar radiation collectors of this type are disclosed in U.S. Pat. No. 4,059,095 wherein a further foil which is pervious to solar radiation, is disposed in front of the mat, when seen in the direction of the solar radiation, to serve as a cover, and is likewise welded, or heat sealed to the mat along the lines where the two foils forming the mat are connected, the cover being connected in such a manner that air-filled chambers are formed, between these connecting lines, between the mat on the one hand and the cover on the other hand. These air-filled chambers serve as heat insulation.

SUMMARY OF THE INVENTION

It is an object of the present invention to construct a solar radiation collector of the above-described type in such a way that, after removal of the fluid heat carrier medium, it has a completely flat configuration.

This and other objects are achieved according to the invention in a solar radiation collector of the type described above, by forming the cover to define a flexible support for holding at least one radiation pervious pane and at least one reflecting panel in relative positions such that the pane, the panel and the mat constitute the legs of a triangle enclosing the air space.

In preferred embodiments of the invention, the foil members are joined together at interior locations of the mat along connection lines parallel to the opposed edges of the mat at which the cover is connected, to form parallel flow channels defining portions of the flow path and extending parallel to those opposed edges.

In order to obtain a completely flat unit when the heat carrier medium is removed, the present invention provides that the pane and/or the reflector plate can be removed from the flexible mount connected with the mat so that only the flexible mount rests on the mat. It is also possible, however, in accordance with the invention, to so dimension the flexible mount, the transparent pane and the reflector plate that after removal of the heat carrier medium, i.e. when the mat is flat, the cover formed by the three parts likewise lies flat on the mat, while filling of the mat with heat carrier medium, causes the pane and the reflector plate to be pivoted up into the triangular configuration due to the reduction of that dimension of the mat which constitutes a leg of the triangle as a result of the filling process. In this case, the regions of the flexible mount extending between reflector plate and mat, between the pane and the mat, and between the mat and the reflector plate serve as hinges.

DESCRIPTION OF THE PREFERRED EMBODIMENTS

Figure 1:
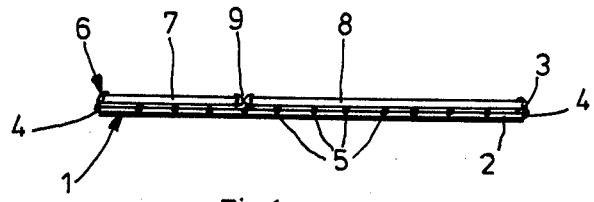
FIG. 1 is a cross-sectional pictorial view of a preferred embodiment of a solar collector according to the invention in its unfilled state.
Figure 2:
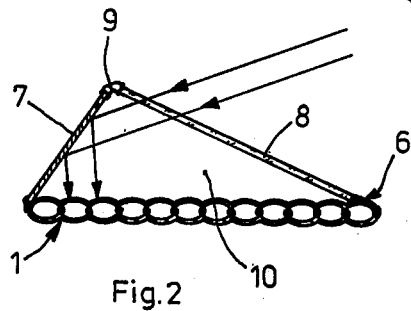
FIG. 2 is a corresponding cross-sectional view of the same embodiment in its filled, operational state.

The article shown in FIGS. 1 and 2 includes a mat 1 formed, in a known manner, of a black foil member 2 and a radiation pervious foil member 3. These two foil members are welded together along their edges 4 in a sealing manner and are additionally joined together along lines 5, also by welding, so that, as known, a meandering flow path is formed for the fluid heat carrier medium. Corresponding inlet and outlet for the medium (not shown) are provided at the ends of that path. It can be seen that in the unfilled state the mat 1 is completely flat.

At opposed edges 4 a flexible mount 6 for holding a metal reflector plate 7 and a glass pane 8 are likewise joined, e.g. by welding, to the mat 1 and a flexible bar 9 of mount 6 is disposed between the two parts 7 and 8. As shown in FIG. 1, the dimensions of the parts 6, 7 and 8, which form a cover for the mat, have been selected so that sum of the dimensions of parts 7,8 and 9 between edges 4 coincides with the corresponding dimension of the mat 1, whereby a flat configuration results.

However, as soon as the mat 1 has been filled with the heat carrier medium, it assumes the inflated state shown in FIG. 2, reducing the dimension of mat 1 between edges 4, and since the flexible mount 6 is connected to the wedges 4 the reflector plate 7 and the glass pane 8 pivot counterclockwise and clockwise, respectively, to form an upstanding triangular configuration. This also creates a heat insulating space, or chamber, 10 between the cover formed essentially of parts 7 and 8 on the one hand and the mat 1 on the other hand. No separate measures are required to support the reflector plate 7 and the pane 8.

Figure 3:
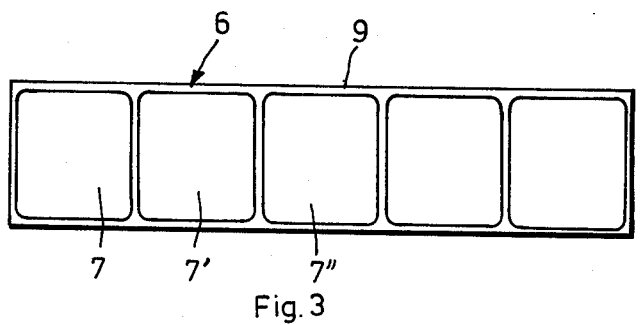
FIG. 3 is a side elevational view illustrating the reflector plates of the embodiment of FIGS. 1 and 2.

As shown in FIG. 3, a plurality of reflector plates 7, 7', 7" etc., and correspondingly a plurality of panes, may be provided. The elasticity of the mount 6 also makes it possible to remove, if required, all or individual ones of the reflector plates and of the glass panes to transport the solar radiation collector. As FIG. 3 indicates, mount 6 is formed to provide a frame surrounding the, or each, plate 7 and pane 8.

Reverting to FIG. 2, the effect of the reflector plate 7 or incident radiation is shown by arrows illustrating the path followed by such radiation when the sun is at a low position in the sky, at which time the reflector plate 7 serves to collect and direct onto the mat 1 those rays which would otherwise not contribute energy to the solar radiation collector.

Understandably the region between the mat and the cover will be closed by means of foils at the front and rear ends of the collector, which ends are parallel to the plane of FIGS. 1 and 2 and have a triangular configuration when the mat 1 is inflated.

Figure 4:
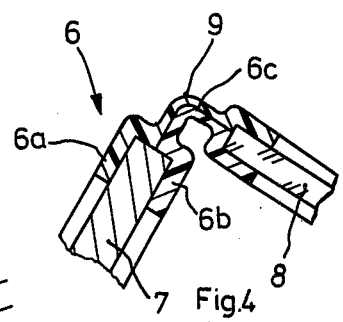
FIG. 4 is a view corresponding to FIG. 2 but showing only the area of the upper edge of the embodiment in an enlarged scale.

As shown in FIG. 4, the mount 6 can consist of two profiles 6a and 6b which are connected by welding, heat sealing or gluing along their contacting surfaces 6c. Preferably the mount 6 is made from rubber or a rubber-like material the thickness of which of course depends on the dimensions and the weight of plate 7 and pane 8.

It will be understood that the above description of the present invention is susceptible to various modifications, changes and adaptations, and the same are intended to be comprehended within the meaning and range of equivalents of the appended claims.

What is claimed is:

1. In a solar radiation collector composed of a mat formed of a black foil member and a radiation pervious foil member, the two members being joined together along the outer edges of the mat and at interior locations of the mat to form an extended flow path and an inlet and outlet for a fluid heat carrier medium, the collector further including cover means connected to the mat along opposed edges thereof and arranged to be disposed in the path of solar radiation toward the mat with an air space being defined between the mat and the cover means, the improvement wherein said cover means includes flexible mounting means formed adjacent opposed edges thereof for holding at least one radiation pervious pane and at least one reflecting panel, and said flexible mounting means and said mat are dimensioned such that, when such pane and panel are held by said flexible mounting means and said mat is filled with such carrier medium, said flexible mounting means holds the pane and panel in relative positions such that the pane, the panel and said mat constitute the legs of a triangle enclosing the air space.

2. An arrangement as defined in claim 1 wherein said members are joined together at interior locations of said mat along connection lines parallel to said opposed edges of said mat at which said cover means are connected, to form parallel flow channels defining portions of said flow path and extending parallel to said opposed edges.

3. An arrangement as defined in claim 2 wherein said flexible mounting means is arranged to removably hold at least one of the pane and the reflector plate.

4. An arrangement as defined in claim 2 or 3 wherein the dimension of said cover means beween said opposed edges, when said cover means is in a flattened state, is equal to the corresponding dimension of said mat, when said mat is free of carrier medium and is in a flattened state, so that when said corresponding dimension of said mat is decreased due to filling of said mat with carrier medium, a pane and reflector plate held by said cover means pivot upwardly to form the triangular configuration.

* * * * *